(12) United States Patent
Hozumi et al.

(10) Patent No.: US 6,733,715 B2
(45) Date of Patent: May 11, 2004

(54) FABRICATION OF HOLLOW CERAMICS FIBERS USING UNIDIRECTIONALLY ORIENTED ORGANIC FIBERS PREARRANGED BASED ON ELECTROSTATIC MEANS

(75) Inventors: Atsushi Hozumi, Aichi (JP); Yoshiyuki Yokogawa, Aichi (JP); Tetsuya Kameyama, Aichi (JP)

(73) Assignee: National Institute of Advanced Industrial Science and Technology, Tokyo (JP)

( * ) Notice: Subject to any disclaimer, the term of this patent is extended or adjusted under 35 U.S.C. 154(b) by 303 days.

(21) Appl. No.: 09/955,074

(22) Filed: Sep. 19, 2001

(65) Prior Publication Data

US 2002/0070482 A1 Jun. 13, 2002

(30) Foreign Application Priority Data

Sep. 19, 2000 (JP) .......................... 2000-283696

(51) Int. Cl.⁷ .................. B29C 33/38; B29C 33/76; B29C 67/20; H02N 11/00
(52) U.S. Cl. .................. 264/430; 264/42; 264/49; 264/219; 264/301; 264/317; 264/437; 264/438
(58) Field of Search .................. 264/42, 438, 44, 264/49, 219, 301, 317, 430, 437, 610, 628, 640

(56) References Cited

U.S. PATENT DOCUMENTS 5,017,522 A * 5/1991 Hegedus .................. 501/81
5,916,510 A * 6/1999 Jessen .................. 264/610

FOREIGN PATENT DOCUMENTS

JP 11116352 A * 4/1999

OTHER PUBLICATIONS

Satoshi Kobayashi et al., "Preparation of $TiO_2$ Hollow–Fibers Using Supramolecular Assemblies", Chem. Mater, 2000, vol. 12, pp 1523–1525.

Tomohito Itoh, et al., "Electrostatic Orientation of Ceramic Short Fibers in Liquid", Journal of Electrostatics, 1994, vol. 32, pp 71–87.

Senichi Masuda, et al., "Electrostatic Means for Fabrication of Fiber–Reinforced Metals", IEEE Transactions on Industry Applications, May/Jun. 1989, vol. 25, No. 3, pp 552–557.

* cited by examiner

Primary Examiner—Leo B. Tentoni
(74) Attorney, Agent, or Firm—Oblon, Spivak, McClelland, Maier & Neustadt, P.C.

(57) ABSTRACT

A method of manufacturing hollow ceramics fibers with the pores of the micron-scale hollow structure unidirectionally oriented, the method of manufacturing is characterized in the steps of dispersing organic fibers in a dielectric liquid and applying high voltage to the dielectric liquid containing the dispersed organic fibers to electrostatically align them to produce a fiber accumulation in which the organic fibers are unidirectionally oriented, using the fiber accumulation as a mold and dipping the fiber accumulation in a ceramics base solution, and then removing the mold by treatment with heat or organic solvents.

33 Claims, 3 Drawing Sheets

FABRICATION OF HOLLOW CERAMICS FIBERS USING UNIDIRECTIONALLY ORIENTED ORGANIC FIBERS PREARRANGED BASED ON ELECTROSTATIC MEANS

BACKGROUND OF THE INVENTION

1. Field of the Invention

The present invention relates to a method for manufacturing a unidirectionally-oriented hollow ceramic fiber aggregate using as a mold a fiber aggregate of organic fibers unidirectionally oriented by electrostatic means, and more particularly to a technology for manufacturing a ceramic fiber aggregate by which a ceramic fiber aggregate with a micron-scale hollow structure and with a unidirectional orientation can be formed by dipping the aforementioned fiber aggregate in a ceramics base solution (ceramics material or ceramics material precursor) to form a ceramics fiber precursor with an organic-inorganic structure, and treating the precursor by heat or other means to remove the organic fiber aggregate from the ceramics fiber precursor.

2. Description of the Related Art

In general, porous ceramic bodies show great promise in a variety of fields including adsorption and separation. The IUPAC classification divides porous bodies into microporous bodies with a pore size of less than 2 nm, mesoporous bodies with a pore size of 2–50 nm and macroporous bodies with a pore size over 50 nm. If it were possible to control the pore size of porous bodies freely and precisely, they would open the door to such applications as selective adsorbent and catalyst materials and high separation materials.

Known methods of producing mesoporous and macroporous materials include methods, wherein as the mold a molecular aggregate of surfactants, an aggregate containing both surfactant molecules and specific organic molecules, or a molecular aggregate of different kinds of surfactants is used. Because the maximum pore size obtained with these organic molecules is about 30 nm, they cannot be used as filters for selectively separating bacteria (0.5–5 $\mu$m$\phi$), molds (hyphae 5–30 $\mu$m, spores 3–10 $\mu$m), or viruses (150–180 nm).

There are conventional, commercially available ceramic filters in which the pore size is controlled above submicroscopic level by dispersing and baking of bulk powder, and because the ceramic grains in the filters are randomly arranged in 2 and 3 dimensions, bacteria, dust, and the like becomes trapped in gaps between the grains when the gas or liquid containing them passes through the gaps. Because the gaps are very irregular, however, it is difficult to trap bacteria and the like efficiently in the filter, and clogging of the gaps is occurred also frequently, necessitating treatment such as back washing is requested. More efficient separation might be achieved and clogging of the gaps might be prevented if the gas or liquid were passed through the hollows of a micron-scale hollow structure in which the pores were unidirectionally aligned. Attempts have been made in the past to obtain a porous body by adding combustible organic fibers, but there have been almost no attempts to obtain a porous body by using organic fiber molds with the organic fibers unidirectionally arranged. There have also been efforts to form cavities by using separate phase glass or the eutectic effect, but it is difficult to create through holes.

As described above, a ceramic fiber aggregate with a micron-scale hollow structure can be obtained by using as a mold an organic fiber aggregate of silk, cotton or the like to form a ceramic fiber precursor with an organic-inorganic structure, and removing the organic fiber aggregate from the precursor by treatment with heat or organic solvents, but of the conventional processes using organic fiber molds, almost none include unidirectional control of the organic fibers.

With the foregoing in view, the inventors have succeeded after dedicated research in forming a unidirectionally-oriented organic fiber aggregate by setting 0.1–50 mm sections of organic fiber dispersed in dielectric liquid between positive and negative electrodes with a high voltage charge and electrostatically aligning the individual fibers in the dielectric liquid with one end towards the positive electrode and the other towards the negative electrode, and then have discovered that ceramic fiber can be produced having a micron-scale hollow structure with unidirectionally-oriented pores by using the organic fiber aggregate as a mold to form a ceramic fiber precursor with an inorganic-organic structure, and then treating the precursor with heat, organic solvents or the like to break down and remove the organic fibers, leaving only the inorganic structure, and the present invention has been perfected based on these findings.

SUMMARY OF THE INVENTION

A method is provided of manufacturing hollow ceramics fibers using a mold of organic fibers unidirectionally oriented by electrostatic means. The present invention relates to a method of manufacturing hollow ceramics fibers with the pores of the micron-scale hollow structure unidirectionally oriented, the method of manufacturing is characterized in the steps of dispersing organic fibers in a dielectric liquid and applying high voltage to the dielectric liquid containing the dispersed organic fibers to electrostatically align them to produce a fiber accumulation in which the organic fibers are unidirectionally oriented, using said fiber accumulation as a mold and dipping said fiber accumulation in a ceramics base solution, and then removing said mold by treatment with heat or organic solvents.

Namely, an object of the present invention is to provide a means of producing a ceramic fiber aggregate with a micron-scale hollow structure consisting of an inorganic skeleton, by unidirectionally aligning organic fibers by electrostatic means, and then using the resulting aligned organic fiber aggregate as a mold to produce the hollow ceramics fibers.

In order to solve the problems described above, the present invention comprises the following technical means.

(1) A method of manufacturing hollow ceramics fibers with the pores of the micron-scale hollow structure unidirectionally oriented, the method for manufacturing is characterized in the steps of dispersing organic fibers in a dielectric liquid and applying high voltage to the dielectric liquid containing said organic fibers to electrostatically align them and to produce a fiber accumulation of unidirectionally-oriented organic fibers, taking the fiber accumulation as a mold and dipping it in a ceramics base solution, and removing the mold by treatment with heat or organic solvents.

(2) The method for manufacturing hollow ceramics fibers unidirectionally-oriented described above (1), wherein the organic fiber is one selected from the group of raw silk, cotton, hemp, nylon, polyester, acrylic, cellulose and chitin.

(3) The method for manufacturing hollow ceramics fibers unidirectionally-oriented described above (1), wherein the ceramics base solution is composed of an alkoxide or chloride of titanium, aluminum, zirconium, silicon or the like and alcohol, and optional water, hydrochloric acid or the like.

(4) The method for manufacturing hollow ceramics fibers unidirectionally-oriented described above (1), wherein the ceramics base solution is formed from polyethylene glycol, surfactants and organic polymers such as block copolymer in addition to an alkoxide or chloride of titanium, aluminum, zirconium or silicon and alcohol, and optional water, hydrochloric acid or the like.

(5) The method for manufacturing hollow ceramics fibers unidirectionally-oriented described above (1), wherein dipping is performed by the dip coating, dipping or spin coating method.

(6) The method for manufacturing hollow ceramics fibers unidirectionally-oriented described above (1), wherein the mold is removed by treatment with heat or organic solvents.

DESCRIPTION OF THE PREFERRED EMBODIMENTS

The present invention is described in more detail below.

The present invention is characterized in that an organic fiber aggregate is formed by unidirectionally orientating organic fibers such as silk and cotton by electrostatic means, then using the organic fiber aggregate as a mold and dipping it in a ceramics base solution, and then removing the mold to produce a unidirectionally-oriented hollow ceramic fiber aggregate with a micron-scale hollow structure.

Organic fibers that can be used in the present invention include, for example, raw silk, cotton, hemp, nylon, polyester, acrylic, cellulose or chitin, and the silk is used preferably. These fibers are cut to lengths of 0.1–10 mm and dispersed in a dielectric liquid, and a fiber length of 0.5–5 mm is preferable. Dielectric liquids that can be used include, for example, carbontetrachloride, n-hexane, cyclohexane, and fluorine and chlorine substituted carbon, and the fluorine and chlorine substituted carbon is particularly desirable from the standpoint of safety. Because organic fibers such as silk do not tend to aggregate as much in dielectric liquid as do alumina, silica and other ceramic fibers, there is little need for surface modification with surfactants and the like. If the organic fibers are soiled is severely, however, it is preferable to wash them in 40–50° C. water, which is followed by drying.

Figure 1:
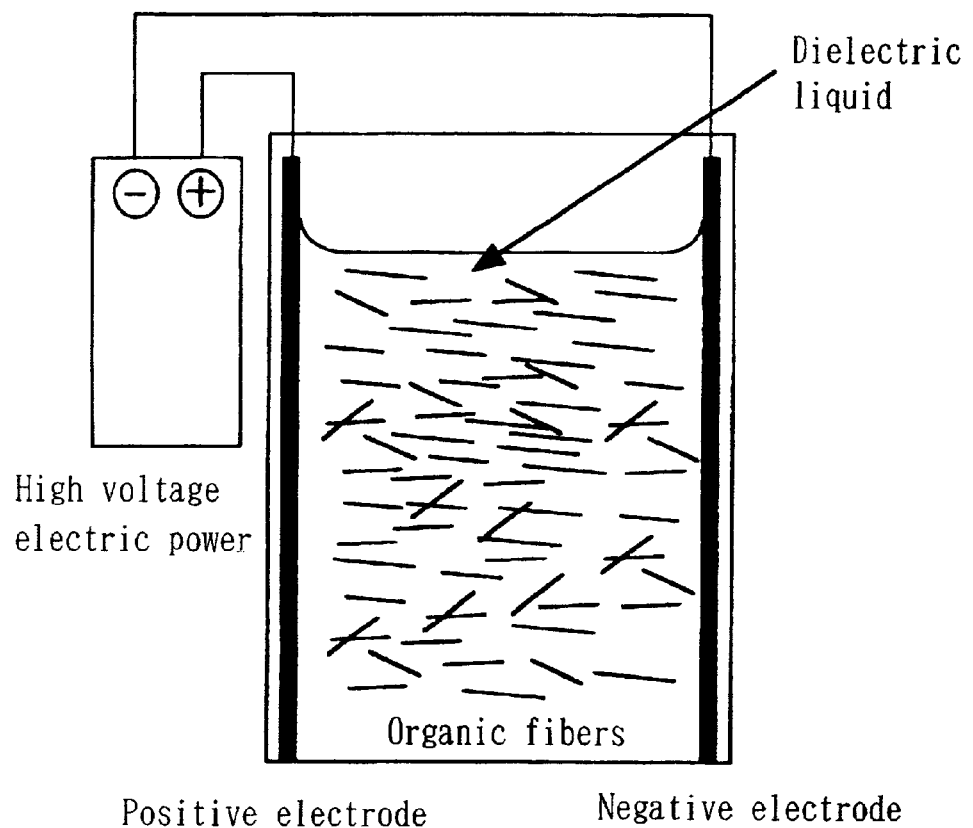
FIG. 1 is a simplified diagram of the apparatus for orientating the organic fiber, which is used in Examples 1 and 2.
Figure 2:
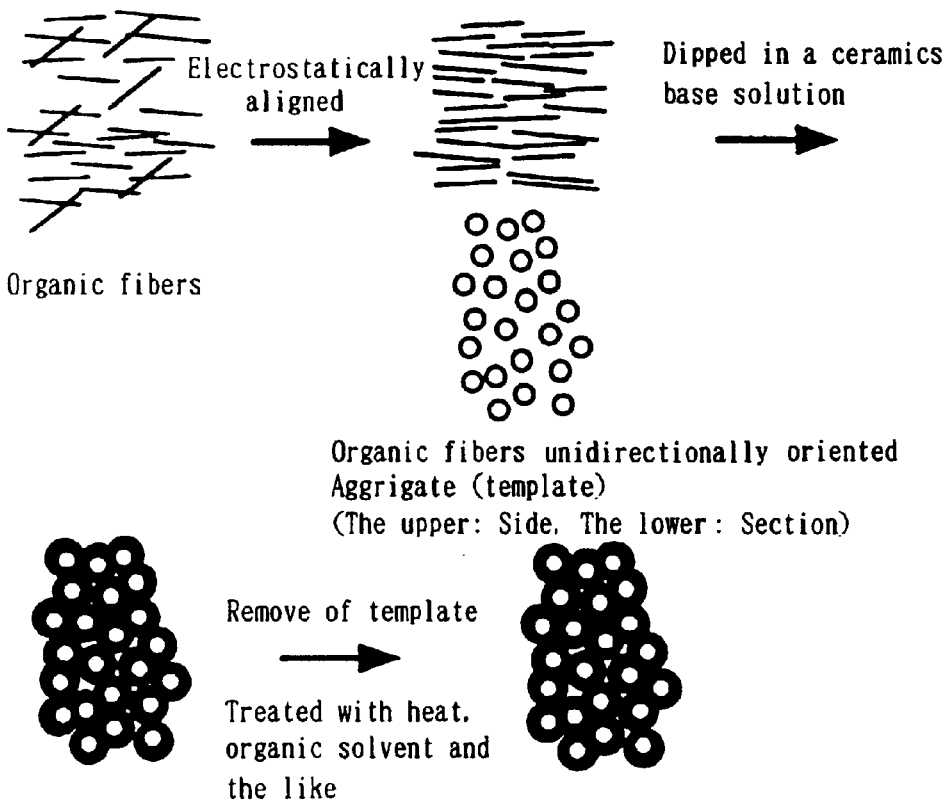
FIG. 2 is a simplified diagram of the steps in manufacturing the unidirectionally-oriented ceramic tubes in Examples 1 and 2.
Figure 3:
FIG. 3 shows the unidirectionally oriented organic fibers of the product manufactured in Example 1.

Next, in order to produce the unidirectionally oriented organic fibers, orientation of the organic fibers is performed with the organic fiber orientating device shown in FIG. 1. A dielectric liquid containing the dispersed organic fibers is placed between positive and negative electrodes charged with high voltage, and the individual fibers in the dielectric liquid are electrostatically orientated so that one end is towards the positive electrode and the other towards the negative electrode. Preferably, direct current high voltage of about 1–20 kV/1–2 cm is applied as the direct current voltage between the positive and negative electrodes. In this case, a voltage of about 15 kV/1–2 cm is preferred because it provides a stable electrostatic orienting force.

Next, the fiber aggregate is dipped in a ceramics base solution with the organic fibers unidirectionally oriented. The dipping method may be selected at will from the methods such as impregnation, dip coating and spin coating, and the impregnation is used preferable. The ceramics base solution may be composed of an alkoxide or chloride of titanium, aluminum, zirconium, silicon or the like and alcohol, as well as water, hydrochloric acid or the like as necessary. In other words, the solution to be used as the ceramics base solution contains either an alkoxide of said titanium, etc. and alcohol, or a chloride of said titanium, etc. and alcohol as essential components, and water, hydrochloric acid and the like as optional components. A suitable alkoxide or chloride can be used, with no particular limitations.

In this case, it is also possible to add an organic polymer such as polyethylene glycol to the solution ahead of time. In this way, an even better porous body can be produced by thermally decomposing the organic fiber mold by a heat process to remove it, making the hollow ceramic porous and increasing the specific surface area.

Furthermore, it is also possible to add a surfactant or organic polymer such as block polymer to the solution in order to provide the hollow ceramic with pores on a nanometer scale. Examples of such surfactants or block polymers include but are not limited to cetyltrimethyl ammonium chloride, hexadecyltrimethyl ammonium bromide, PLURONIC E127 (BASF), and PLURONIC P-123 (BASF). In the same way as described above, the hollow ceramic is thus provided by heat processing with pores on a nanometer scale, allowing the formation of a ceramic fiber aggregate with a micron-scale hollow structure and pores on a nanometer scale.

Next, as described above, after being dipped in the ceramic base solution the organic fiber aggregate mold is removed by treatment with heat or organic solvents such as hydrochloric acid, sulfuric acid, nitric acid, formic acid, trichloroacetic acid, dichloroacetic acid and dimethyl acetoamide solution. Heat treatment is performed by preference. In this case, a treatment temperature of 300–700° C. and treatment time of 1–3 hours are preferred. In this way, a ceramic fiber aggregate with a micron-scale hollow structure can be formed with a unidirectional orientation.

In the steps described above, organic fibers are unidirectionally oriented by the application of high voltage in a dielectric liquid, so that the individual organic fibers in the dielectric liquid are electrostatically aligned with one end towards the positive electrode and the other towards the negative electrode, resulting in the formation of a unidirectionally oriented organic fiber aggregate.

EXAMPLES

The present invention is explained in detail below based on examples, but the present invention is not limited by these examples.

Example 1

(1) Method

Commercial silk thread was cut in 5 mm lengths, and dispersed in a dielectric solution (FLORINATE, 3M) at a rate of 0.15 g/50 cc. Next, the solution was poured into an apparatus equipped with parallel flat electrodes (15 cm high, 3.5 cm wide) 1.2 cm apart, and 5 kV/1–2 cm of direct current voltage was applied between the electrodes. The aligned and aggregated silk thread sank to the bottom of the apparatus, forming a mat. It was then removed from the apparatus and dried in air for 24 hours. This mat of silk thread was then placed between two glass slides, fixed, dipped in a solution of titanium tetraisopropoxide, acetylacetone and ethanol (mole ratio 1:0.5:90), and dried for 30 minutes at 70° C. It was then kept for 1 hour in an electric furnace at a constant temperature of 650° C.

(2) Results

X-ray analysis (XRD) revealed that only titania (anatase type) was produced. Observation of the sides of the product by optical microscope confirmed that the ceramic fibers were largely oriented in one direction. Furthermore, observation of a cross-section of the product by scanning electron microscope (SEM) confirmed a 1.5–2 micron hollow structure.

Example 2

(1) Method

Commercial silk was cut in 5 mm lengths, and dispersed in a dielectric solution (FLORINATE, 3M) at a rate of 0.15 g/50 cc. Next, the solution was poured into an apparatus equipped with parallel flat electrodes (15 cm high, 3.5 cm wide) 1.2 cm apart, and 15 kV/1–2 cm of direct current voltage was applied between the electrodes. The aligned and aggregated silk thread sank to the bottom of the apparatus, forming a mat (1.2 cm×3.5 cm×0.3 cm). It was then removed from the apparatus and dried in air for 24 hours. This mat of silk thread was then placed between two glass slides, fixed, dipped for 1 hour at room temperature in a solution of water, hydrochloric acid, cetyltrimethyl ammonium chloride (surfactant), and tetraethoxy silane (mole ratio 100:7:0.11:0.1), and dried for 30 minutes at 70° C. It was then kept for 1 hour in an electric furnace at a constant temperature of 300° C.

(2) Results

X-ray analysis (XRD) revealed the production of mesoporous silica with a pore size of about 3.5 nanometers. Observation of the sides of the product by optical microscope confirmed that the ceramic fibers were largely oriented in one direction. Furthermore, observation of a cross-section of the product by scanning electron microscope (SEM) showed a 1.5–2 micron hollow structure, confirming the formation of hollow ceramic fibers on the nano- and micron-scales.

Comparative Example 1

Commercial silk thread was cut in 5 mm lengths and formed into a mat (1.2 cm×3.5 cm×0.3 cm) which was placed between two glass slides, fixed, dipped in a solution of titanium tetraisopropoxide, acetyl acetone and ethanol (mole ratio 1:0.5:90) and dried for 30 minutes at 70° C. It was then kept for 1 hour in an electric furnace at a constant temperature of 650° C.

X-ray analysis (XRD) revealed that only titania (anatase type) was produced. However, observation of the sides of the product by optical microscope showed that the hollow ceramic fibers were completely random. Moreover, observation of a cross-section of the product by scanning electron microscope (SEM) confirmed only a partial 1.5–2 micron hollow structure.

Comparative Example 2

Commercial silk thread was cut in 5 mm lengths and formed into a mat (1.2 cm×3.5 cm×0.3 cm) which was placed between two glass slides, fixed, dipped for 1 hour at room temperature in a solution of water, hydrochloric acid, cetyltrimethyl ammonium chloride (surfactant) and tetraethoxy silane (mole ratio 100:7:0.11:0.1), and dried for 30 minutes at 70° C. It was then kept for 1 hour in an electric furnace at a constant temperature of 300° C.

X-ray analysis (XRD) revealed the production of mesoporous silica with a pore size of about 3.5 nanometers. However, observation of the sides of the product by optical microscope showed that the ceramic fibers were in a completely random state. Moreover, observation of a cross-section of the product by scanning electron microscope (SEM) confirmed only a partial 1.5–2 micron hollow structure.

According to the present invention, the remarkable effects are achieved, wherein (1) a method of using as a mold a fiber aggregate of organic fibers unidirectionally aligned by electrostatic means is provided, (2) a unidirectionally oriented ceramic fiber aggregate with a micron-scale hollow structure is formed, (3) hollow ceramics with pores on the nanometer scale are provided, (4) a nano- and micron-scale hollow ceramic fiber aggregate with a unidirectional orientation is formed, (5) a ceramic fiber aggregate with a micron-scale hollow structure and an inorganic skeleton is produced, (6) the resulting hollow ceramic fiber aggregate is useful as a selective adsorbent or catalyst material or high separation material, and (7) the aggregate is useful as a filter capable of efficient separation and prevention of clogging because the organic fibers are unidirectionally oriented.

What is claimed is:

1. A method for manufacturing hollow ceramics fibers with the pores of the micron-scale hollow-structure unidirectionally oriented, comprising:

dispersing organic fibers in a dielectric liquid and applying a high voltage to the dielectric liquid containing said organic fibers dispersed to electrostatically align said organic fibers and to produce a fiber accumulation of unidirectionally-oriented organic fibers, using the fiber accumulation as a mold and dipping the same in a ceramics base solution, and then removing the mold by treatment with heat or an organic solvent to form hollow ceramic fibers.

2. The method of claim 1, wherein the organic fiber is at least one selected from the group consisting of raw silk, cotton, hemp, nylon, polyester, acrylic, cellulose and chitin.

3. The method for manufacturing hollow of claim 1, wherein the ceramics base solution comprises at least one alkoxide or chloride of titanium, aluminum, zirconium or silicon, and alcohol, and optionally water; or hydrochloric acid.

4. The method for of claim 1, wherein the ceramics base solution comprises polyethylene glycol, surfactant(s) and organic polymer(s) represented by block copolymer, in addition to at least one alkoxide or chloride of titanium, aluminum, zirconium or silicon, and alcohol, and optionally water or hydrochloric acid.

5. The method of claim 1, wherein dipping is performed by the dip coating, dipping or spin coating method.

6. The method of claim 1, wherein the mold is removed by treatment with heat or an organic solvent.

7. The method of claim 1, wherein the organic fiber is raw silk.

8. The method of claim 1, wherein the organic fiber is cotton.

9. The method of claim 1, wherein the organic fiber is hemp.

10. The method of claim 1, wherein the organic fiber is nylon.

11. The method of claim 1, wherein the organic fiber is polyester.

12. The method of claim 1, wherein the organic fiber is acrylic.

13. The method of claim 1, wherein the organic fiber is cellulose.

14. The method of claim 1, wherein the organic fiber is chitin.

15. The method of claim 1, wherein the dielectric liquid is selected from the group consisting of carbon tetrachionde, n-hexane, cyclohexane, and fluorine and chlorine substituted carbon.

16. The method of claim 1, wherein a voltage ranging from about 15 kV/1–2 cm is applied.

17. The method of claim 1, wherein said ceramics base solution comprises an alkoxide or chloride of titanium.

18. The method of claim 1, wherein said ceramics base solution comprises an alkoxide or chloride of aluminum.

19. The method of claim 1, wherein said ceramics base solution comprises an alkoxide or chloride of zirconium.

20. The method of claim 1, wherein said ceramics base solution comprises an alkoxide or chloride of silicon.

21. The method of claim 1, wherein the ceramics base solution further comprises an organic polymer.

22. The method of claim 1, wherein the ceramics base solution further comprises polyethylene glycol.

23. The method of claim 1, wherein the ceramics base solution further comprises a surfactant or an organic block polymer.

24. The method of claim 1, wherein the ceramics base solution further comprises cetyltrimethyl ammonium chloride, hexadecyltrimethyl ammonium bromide, Pluronic E127 or Pluronic P123.

25. The method of claim 1, wherein the mold is removed by a heat treatment.

26. The method of claim 1, wherein the mold is removed by a heat treatment at a temperature ranging from 300–700° C.

27. The method of claim 1, wherein the mold is removed by treatment with hydrochloric acid.

28. The method of claim 1, wherein the mold is removed by treatment with sulfuric acid.

29. The method of claim 1, wherein the mold is removed by treatment with nitric acid.

30. The method of claim 1, wherein the mold is removed by treatment with formic acid.

31. The method of claim 1, wherein the mold is removed by treatment with trichloroacetic acid.

32. The method of claim 1, wherein the mold is removed by treatment with dichloroacetic acid.

33. The method of claim 1, wherein the mold is removed by treatment with dimethyl acetoamide solution.

* * * * *